(No Model.)
C. HENDRICKS.
CAR COUPLING.
No. 262,668.   Patented Aug. 15, 1882.
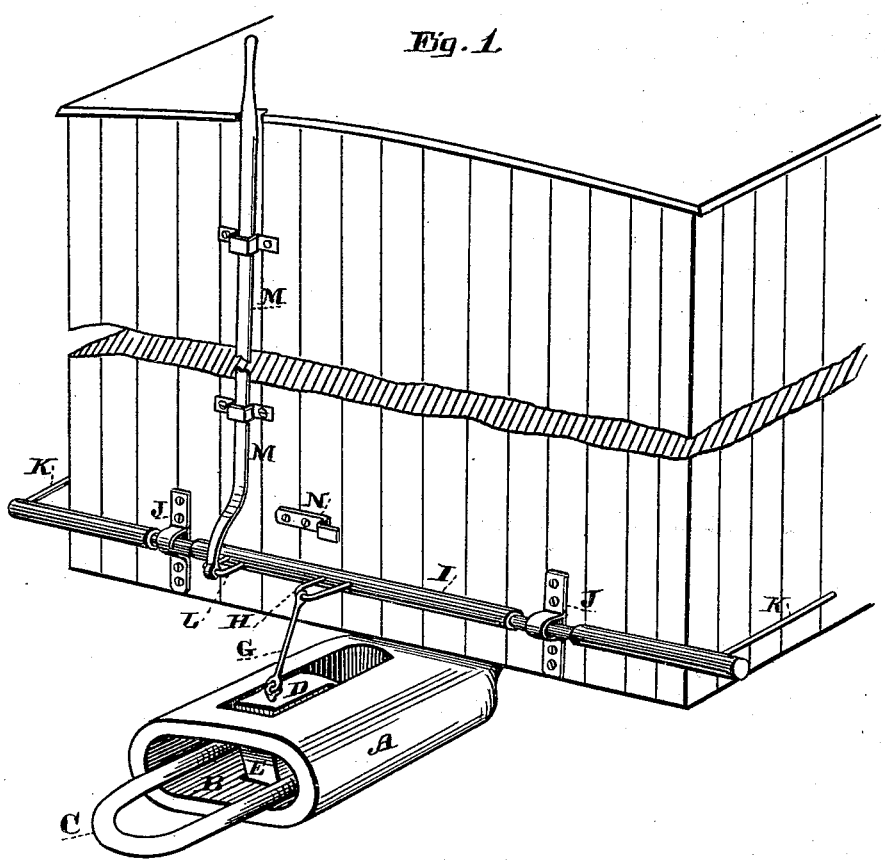
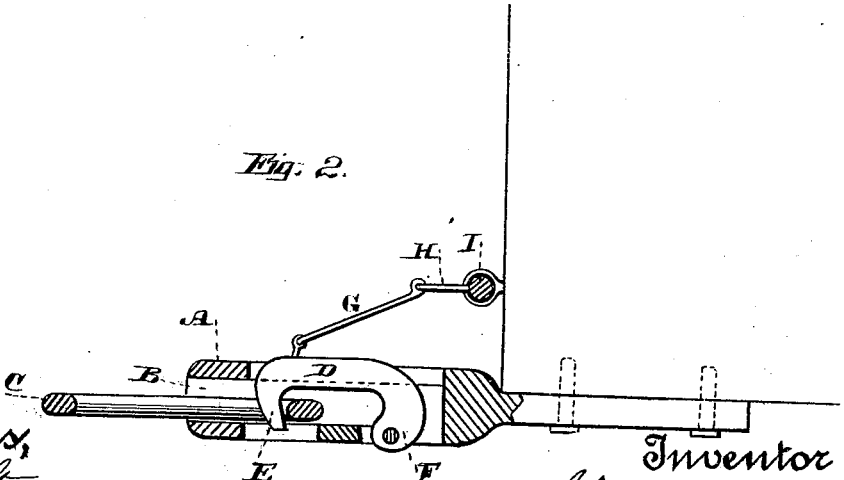
Witnesses,
Geo. H. Strong
[signature]
Inventor
Clarke Hendricks
By Dewey & Co
Attorneys

UNITED STATES PATENT OFFICE.

CLARKE HENDRICKS, OF MODESTO, CALIFORNIA, ASSIGNOR OF ONE-THIRD TO E. B. McKINNEY, OF SAME PLACE.

CAR-COUPLING.

SPECIFICATION forming part of Letters Patent No. 262,668, dated August 15, 1882.

Application filed June 3, 1882. (No model.)

*To all whom it may concern:*

Be it known that I, CLARKE HENDRICKS, of Modesto, county of Stanislaus, State of California, have invented an Improved Railway-Car Coupling; and I hereby declare the following to be a full, clear, and exact description thereof.

My invention relates to certain improvements in the couplings by which connection is made between railway-cars; and it consists in certain specific details of construction, as hereinafter described, and specifically pointed out in the claim.

Referring to the accompanying drawings for a more complete explanation of my invention, Figure 1 is a view of the end of a car with my coupling. Fig. 2 is a detail of construction.

A is a draw-head and bumper, having an opening or mouth, B, into which the coupling-link C enters. In order to hold this link in place, I make a coupling-hook, D, which is so curved that its end E will drop through the link and thus retain it in place. The lower end of this hook extends down below the level of the link-opening, the draw-head being slotted or chambered for the purpose, and its pivot or fulcrum pin F passes through it at a point considerably below the level of the link-opening.

When a link from another car approaching strikes the front part of the hooked end E it will raise the hook, on account of the angle made with the fulcrum-pin, and allow the link to glide beneath it until it reaches a point where the hook will fall through the link and hold it in place.

In order to raise the hook and disengage it from the link for the purpose of uncoupling, a rod or arm, G, connects the top of the coupling-hook with a crank-arm, H, which projects from the shaft I. This shaft extends horizontally across the end of the car, turning in suitable boxes at J, and it has a crank or lever arm, K, at each end, so that it may be operated from either side without going between the cars.

When this device is used upon box-cars a crank-arm, L, projects from this shaft at some point between the ends, and a rod or bar, M, extends upward from it to the top of the car, so that the shaft may be rotated and the link withdrawn by an operator upon the top of the car.

N is a latch or catch fixed to the end of the car, so that when the shaft has been turned to raise the hook and release the link it may be moved a short distance in the direction of its length, and thus bring the crank-arm H behind the catch, where it is held and the hook is prevented from falling. This is useful when it is desired to uncouple cars which are standing together, but which are not to be separated immediately, as it holds the hook up so that the link may be withdrawn at any time. When the arm is released the hook will fall, and, as before described, its shape and the position of the fulcrum are such that a link will always lift it and enter without any care, except to see that it is properly guided as it approaches. The rear of the link-opening is so formed that it prevents the link from going back beyond a certain distance, and thus protects the hook, which lies in a slot behind the opening, from injury.

Having thus described my invention, what I claim as new, and desire to secure by Letters Patent, is—

The car-coupling device consisting of the draw-head A, hook-pin E, pivoted at F below the plane of the link-opening, the rock-shaft I, link G, staple H, vertical rod M, secured to rock-shaft by staple L, and handle K, inserted in rock-shaft, all constructed, arranged, and operated as set forth.

In witness whereof I have hereunto set my hand.

CLARKE HENDRICKS.

Witnesses:
GEO. H. STRONG,
S. H. NOURSE.